United States Patent
Xu et al.

(10) Patent No.: US 8,696,887 B2
(45) Date of Patent: Apr. 15, 2014

(54) CATALYTIC CONVERSION PROCESS

(75) Inventors: Youhao Xu, Beijing (CN); Lishun Dai, Beijing (CN); Longsheng Tian, Beijing (CN); Shouye Cui, Beijing (CN); Jianhong Gong, Beijing (CN); Chaogang Xie, Beijing (CN); Jiushun Zhang, Beijing (CN); Jun Long, Beijing (CN); Zhijian Da, Beijing (CN); Hong Nie, Beijing (CN); Jinbiao Guo, Beijing (CN); Zhigang Zhang, Beijing (CN)

(73) Assignee: China Petroleum & Chemical Corporation, Beijing (CN)

( * ) Notice: Subject to any disclaimer, the term of this patent is extended or adjusted under 35 U.S.C. 154(b) by 795 days.

(21) Appl. No.: 12/672,666

(22) PCT Filed: Aug. 7, 2008

(86) PCT No.: PCT/CN2008/001439
§ 371 (c)(1),
(2), (4) Date: Apr. 23, 2010

(87) PCT Pub. No.: WO2009/018722
PCT Pub. Date: Feb. 12, 2009

(65) Prior Publication Data
US 2010/0213102 A1    Aug. 26, 2010

(30) Foreign Application Priority Data

Aug. 9, 2007 (CN) .......................... 2007 1 0120112
Mar. 13, 2008 (CN) .......................... 2008 1 0101853

(51) Int. Cl.
*C10G 11/00*    (2006.01)

(52) U.S. Cl.
USPC ....................................................... 208/113

(58) Field of Classification Search
USPC ........................................................ 208/106
See application file for complete search history.

(56) References Cited

U.S. PATENT DOCUMENTS 3,702,886 A    11/1972    Argauer et al.
4,422,925 A    12/1983    Williams et al.
(Continued)

FOREIGN PATENT DOCUMENTS

CN    1085885 A    4/1994
CN    1215041 A    4/1999
(Continued)

OTHER PUBLICATIONS

Oil and Gas journal, International Petroleum News and Technology, 2008 (referred to as O&GJ).*

(Continued)

*Primary Examiner* — Randy Boyer
*Assistant Examiner* — Juan Valencia
(74) *Attorney, Agent, or Firm* — Foley & Lardner LLP

(57) ABSTRACT

A catalytic conversion process which comprises catalytic cracking reaction of a hydrocarbon feedstock contacting with a medium pore size zeolite enriched catalyst in a reactor, characterized in that reaction temperature, weight hourly space velocity and catalyst/feedstock ratio by weight are sufficient to achieve a yield of fluid catalytic cracking gas oil between 12% and 60% by weight of said feedstock, wherein said weight hourly space velocity is between 25 $h^{-1}$ and 100 $h^{-1}$, said reaction temperature is between 450° C. and 600° C., and said catalyst/feedstock ratio by weight is between 1 and 30. This invention relates to a catalytic conversion process, especially for heavy feedstock oil to produce higher octane gasoline and an enhanced yield of propylene. More particularly, the invention relates to a process to utilize petroleum oil resources efficiently for decreasing the yield of dry gas and coke significantly.

23 Claims, 3 Drawing Sheets

(56) References Cited

U.S. PATENT DOCUMENTS

| | | | |
|---|---|---|---|
| 4,980,053 A | 12/1990 | Li et al. | |
| 5,232,675 A | 8/1993 | Shu et al. | |
| 5,326,465 A | 7/1994 | Yongqing et al. | |
| 6,045,690 A * | 4/2000 | Fujiyama et al. | 208/153 |
| 6,416,656 B1 * | 7/2002 | Zhang et al. | 208/113 |
| 6,420,621 B2 | 7/2002 | Sha et al. | |
| 6,495,028 B1 * | 12/2002 | Xu et al. | 208/69 |
| 7,678,342 B1 | 3/2010 | Xu et al. | |
| 2007/0293714 A1 | 12/2007 | Long et al. | |
| 2008/0293561 A1 | 11/2008 | Long et al. | |
| 2009/0264693 A1 | 10/2009 | Xie et al. | |
| 2009/0288985 A1 * | 11/2009 | Long et al. | 208/57 |

FOREIGN PATENT DOCUMENTS

| | | |
|---|---|---|
| CN | 1237477 A | 12/1999 |
| CN | 1721506 A | 1/2006 |
| TW | I265174 | 11/2006 |
| WO | WO 00/31215 A1 | 6/2000 |

OTHER PUBLICATIONS

International Search Report mailed Oct. 30, 2008, issued in corresponding PCT Application No. PCT/CN2008/001439 (3 pages).

* cited by examiner

CATALYTIC CONVERSION PROCESS

CROSS-REFERENCE TO RELATED PATENT APPLICATIONS

The application is a National Phase Entry of PCT Application No. PCT/CN2008/001439 filed Aug. 7, 2008, which claims priority to Chinese Patent Application No. 200810101853.9 filed Mar. 13, 2008 and Chinese Patent Application No. 200710120112.0 filed Aug. 9, 2007, including the specification, claims, abstract and drawings, incorporated herein by reference in their entirety.

FIELD OF THE INVENTION

This invention relates to a catalytic conversion process. More particularly, the invention relates to a catalytic conversion process for converting heavy feedstocks into high octane gasoline and an enhanced yield of propylene, wherein the yields of dry gas and coke decrease significantly, thereby petroleum oil resources are utilized efficiently.

BACKGROUND OF THE INVENTION

Light olefins such as propylene are important organic chemical feedstocks. Commercial propylene is used to produce polypropylene, acrylonitrile and other chemicals. The propylene requirement is increasing year by year with a sharply increasing demand for polypropylene derivates. Worldwide annual propylene requirement amount increased from 15.2 million tons of twenty years ago to 51.2 million tons in 2000 and average annual increasing rate was 6.3%. It is estimated that there will be 86 million tons of propylene requirement in 2010 and average annual increasing rate will be 5.6% during that period.

Steam cracking and fluid catalytic cracking (FCC) are the main processes to produce propylene. Light oil such as naphtha can be used as the feedstock in steam cracking to produce ethylene and propylene, and the yield of propylene is only about 15% by weight. However, the feedstock of FCC process is heavy oil such as vacuum gas oil (VGO). Currently, 61% amount of propylene is from a byproduct of steam cracking process which produces ethylene, and 34% amount of propylene is produced by FCC, and about 5% amount of propylene is produced by propane dehydrogenation and ethylene-butene metathesis process.

Petrochemical industry will face to the shortage of light feedstock, deficiency of the processing capacity, high cost and other restrictive factors if ethylene and propylene are produced by the conventional petrochemical process such as steam cracking.

The role of FCC is increasingly concerned since FCC has advantage of wide adaptability of feedstock and flexible operation. Almost 50% amount of propylene is from FCC in U.S.A. The catalytic cracking technology with enhanced propylene yield is being improved quickly.

U.S. Pat. No. 4,980,053 discloses a process to produce gaseous olefins by catalytic conversion of hydrocarbons. Various fractions of petroleum, including residual oils and crude oils, are catalytically converted in fluidized or moving bed reactors with solid, acidic catalysts at a temperature of 500° C. to 650° C., and a pressure of 0.15 MPa to 0.3 MPa, with a weight hourly space velocity of 0.2 $hr^{-1}$ to 20 $hr^{-1}$ and catalyst to oil ratio of 2 to 12. Catalyst is continuously recycled between the reactor and the regenerator. The total yield of propylene and butene is about 40% by weight of the feedstock, and propylene yield is about 26.34% by weight of the feedstock.

WO00/31215A1 discloses a process for catalytic cracking to produce light olefin, which uses the catalyst comprising ZSM-5 and/or ZSM-11 as active component and much of inert substance as matrix. However, the yield of the propylene is less than 20% by weight of VGO.

U.S. Pat. No. 4,422,925 discloses a fluid catalytic cracking process in which a plurality cracking performance of hydrocarbon feedstocks including at least one gaseous paraffinic hydrocarbon feedstock and at least one liquid hydrocarbon feedstock are subjected to different cracking reaction conditions in several reaction zones in the present of regenerated catalyst to produce enhanced yield of light olefins.

Preserved amount of gasoline automobile has progressed rapidly due to economic development and the requirement of high quality gasoline is increasing. Presently improving gasoline octane number technologies include catalytic reforming, alkylation, isomerization, adding an gasoline octane number enhancing additive, and the like. The advantage of catalytic reforming is the heavy fraction of gasoline having high octane number, however, the octane number of light fraction gasoline is lower, in particular, the reforming catalyst cost is higher and the quality of feedstock is strictly required. Alkylation and isomerization technology can produce high octane number and good sensitivity gasoline which is a desirable high octane number clean gasoline component, there is, however, corrosion and environmental protection problem with the used catalyst. The octane number enhancing additive such as MTBE and ETBE can increase gasoline octane number and improve automobile performance, but the cost is higher. Catalytic cracking gasoline is a main source of automobile gasoline pool. The octane number of catalytic cracking gasoline is affected by lower octane number heavy gasoline fraction. Generally, the quality of FCC diesel is worse than straight-run diesel oil. FCC diesel oil is rich in mono ring aromatic hydrocarbons, which can be catalytically converted to high octane gasoline component and propylene product.

The prior arts are insufficient in paraffin molecules catalytic conversion, therefore the dry gas is increasing sharply when the propylene yield grows. Because of underutilization of the gasoline potential content of diesel oil which can produce high octane gasoline and light olefins, there still have room to improve for the quality and yield of gasoline. Therefore, it is desirable to develop a process for catalytic cracking of heavy feedstocks to produce an enhanced yield of high octane number gasoline and an enhanced yield of propylene to meet the market requirements of light olefin and gasoline.

SUMMARY OF THE INVENTION

An object of the present invention is to provide a catalytic conversion process; in particular, for converting heavy feedstocks into high octane gasoline and an enhanced yield of propylene, wherein the yields of dry gas and coke decrease significantly, thereby petroleum oil resources are utilized efficiently.

In an embodiment of the present invention, a catalytic conversion process provided by the present invention comprises catalytic cracking reaction of a hydrocarbon feedstock contacting with a medium pore size zeolite enriched catalyst in a reactor, characterized in that reaction temperature, weight hourly space velocity (WHSV) and catalyst/feedstock ratio by weight (C/O) are sufficient to achieve a yield of fluid catalytic cracking gas oil (FGO) between 12% and 60% by weight of said feedstock, wherein said WHSV is between 25

$h^{-1}$ and 100 $h^{-1}$, said reaction temperature is between 450° C. and 600° C., and said C/O is between 1 and 30.

In the more preferred embodiment, reaction temperature is between 450° C. and 600° C., and preferably between 460° C. and 580° C., and even more preferably between 480° C. and 540° C.

In the more preferred embodiment, WHSV is between 30 $h^{-1}$ and 80 $h^{-1}$, and preferably between 40 $h^{-1}$ and 60 $h^{-1}$.

In the more preferred embodiment, C/O is between 1 and 30, and preferably between 2 and 25, and even more preferably between 3 and 14.

In the more preferred embodiment, reaction pressure is between 0.10 MPa and 1.00 MPa.

In the more preferred embodiment, said feedstock is selected from or includes petroleum hydrocarbons and/or other mineral oils, wherein the petroleum hydrocarbon is one selected from the group consisting of vacuum gas oil (VGO), atmospheric gas oil (AGO), coker gas oil (CGO), deasphalted oil (DAO), vacuum residue (VR) and atmospheric residue (AR) or mixtures thereof, and the other mineral oil is one selected from the group consisting of coal liquefied oil, tar sand oil and shale oil or mixtures thereof.

In the more preferred embodiment, said catalyst comprises zeolite, inorganic oxide and optional clay, which account for the following percent of the total weight of the catalyst respectively: zeolite 1~50% by weight, inorganic oxide 5~99% by weight, and clay 0~70% by weight. Said zeolite is selected from medium pore size zeolite and optional large pore size zeolite. Said medium pore size zeolite accounts for 51~100% of the total weight of the zeolite, and preferably for 70~100% of the total weight of the zeolite. Said large pore size zeolite accounts for 0~49% of the total weight of the zeolite, and preferably for 0~30% of the total weight of the zeolite. Said medium pore size zeolite is selected from ZSM series zeolites and/or ZRP zeolites and said large pore size zeolite is selected from Y series zeolites.

In the more preferred embodiment, said reactor is selected from a riser, an iso-linear speed fluidized bed, an iso-diameter fluidized bed, a descending transfer line and a ascending transfer line or a combination thereof, or a combination of same reactors (two or more reactors), wherein said combination includes cascade or/and parallel. Said riser is a conventional iso-diameter riser or various diverse diameter risers.

In the more preferred embodiment, said feedstock is charged into reactor from one position, or from two or more positions whose height are same or different.

In the more preferred embodiment, said process comprises:

(1) Reaction products and catalyst are separated, wherein catalyst is stripped, regenerated by burning off the coke, and then returns to the reactor.

(2) The separated products include propylene, high octane gasoline and FGO.

In the more preferred embodiment, the initial boiling point of said FGO is not less than 260° C., and hydrogen content of said FGO is not less than 10.5% by weight.

In the more preferred embodiment, the initial boiling point of said FGO is not less than 330° C., and hydrogen content of said FGO is not less than 10.8% by weight.

Another embodiment provides:

A catalytic conversion process, wherein feedstocks are reacted by contacting with a medium pore size zeolite enriched catalyst in a reactor, which comprises:

(1) Said feedstocks include hard crackability feedstock and easy crackability feedstock, which are injected into the reactor from one position, or from two or more positions whose height are same or different, (2) Hard crackability feedstock reacts in the reactor not later than easy crackability feedstock, (3) Reaction temperature, WHSV and C/O sufficient to achieve a yield of FGO between 12% and 60% by weight of easy crackability feedstock, (4) Said WHSV of easy crackability feedstock is 5~100 $h^{-1}$.

In the more preferred embodiment, said hard crackability feedstock is one selected from or includes slurry, diesel, gasoline, hydrocarbons with 4~8 carbon atoms, or mixture thereof.

In the more preferred embodiment, said easy crackability feedstock is selected from or includes petroleum hydrocarbons and/or other mineral oils, wherein the petroleum hydrocarbon is one selected from the group consisting of VGO, AGO, CGO, DAO, VR and AR or mixtures thereof, and the other mineral oil is one selected from the group consisting of coal liquefied oil, tar sand oil and shale oil or mixtures thereof.

In the more preferred embodiment, said catalyst comprises zeolite, inorganic oxide and optional clay, which account for the following percent of the total weight of the catalyst respectively: zeolite 1~50% by weight, inorganic oxide 5~99% by weight, and clay 0~70% by weight. Said zeolite is selected from medium pore size zeolite and optional large pore size zeolite. Said medium pore size zeolite accounts for 51~100% of the total weight of the zeolite and said large pore size zeolite accounts for 0~49% of the total weight of the zeolite. Said medium pore size zeolite is selected from ZSM series zeolites and/or ZRP zeolites and said large pore size zeolite is selected from Y series zeolites.

In the more preferred embodiment, said reactor is selected from a riser, an iso-linear speed fluidized bed, an iso-diameter fluidized bed, a descending transfer line and a ascending transfer line or a combination thereof, or a combination of same reactors (two or more reactors), wherein said combination includes cascade or/and parallel. Said riser is a conventional iso-diameter riser or various diverse diameter risers.

In the more preferred embodiment, reaction conditions of hard crackability feedstock are; reaction temperature between 600° C. and 750° C., WHSV between 100 $h^{-1}$ and 800 $h^{-1}$, C/O between 30 and 150, reaction pressure between 0.10 MPa and 1.00 MPa and steam/hard crackability feedstock ratio by weight between 0.05 and 1.00.

In the more preferred embodiment, reaction conditions of easy crackability feedstock are: reaction temperature between 450° C. and 600° C., WHSV between 5 $h^{-1}$ and 100 $h^{-1}$, C/O between 1 and 30, reaction pressure between 0.10 MPa and 1.00 MPa and steam/easy crackability feedstock ratio by weight between 0.05 and 1.00.

In the more preferred embodiment, the reaction conditions of easy crackability feedstock are: reaction temperature between 460° C. and 580° C.; WHSV between 10 $h^{-1}$ and 90 $h^{-1}$, preferably between 20 $h^{-1}$ and 60 $h^{-1}$, and even more preferably between 30 $h^{-1}$ and 50 $h^{-1}$; C/O between 3 and 14.

In the more preferred embodiment, it comprises: reaction products and catalyst are separated, wherein catalyst is stripped, regenerated by burning off the coke, and then returns to reactor, the separated products include propylene, high octane number gasoline and FGO.

In the more preferred embodiment, the initial boiling point of FGO is not less than 260° C., and hydrogen content of FGO is not less than 10.5% by weight.

In the more preferred embodiment, the initial boiling point of FGO is not less than 330° C., and hydrogen content of FGO is not less than 10.8% by weight.

The third embodiment provides:

A process for producing propylene and high octane number gasoline, which comprises:

(1) A feedstock comprising hard crackability feedstock is contacted with a medium pore size zeolite enriched catalyst and cracked in a reactor under the conditions of a reaction temperature between 600° C. and 750° C., a WHSV between 100 $h^{-1}$ and 800 $h^{-1}$, a reaction pressure between 0.10 MPa and 1.00 MPa, a C/O between 30 and 150 and a steam/hard crackability feedstock ratio between 0.05 and 1.00 by weight, (2) A reaction stream containing hard crackability feedstock, along with easy crackability feedstock, is further cracked under the conditions of a reaction temperature between 450° C. and 600° C., a WHSV between 5 $h^{-1}$ and 100 $h^{-1}$, a reaction pressure between 0.10 MPa and 1.00 MPa, a C/O between 1.0 and 30.0 and a steam/easy crackability feedstock ratio between 0.05 and 1.00 by weight, (3) Spent catalyst and product vapors are separated by cyclone separator. Optionally, spent catalyst is charged into stripping section and stripped. The stripped spent catalyst is regenerated by burning off the coke and returns to reactor. The product vapors are separated to obtain a product comprising propylene, high octane number gasoline and FGO, (4) Said FGO is hydrotreated or/and is extracted with aromatic hydrocarbons to obtain hydrotreated FGO (HFGO) or/and a raffinate of FGO (RFGO). Said HFGO or/and RFGO return to step (1) or/and step (2) as hard crackability feedstock or/and easy crackability feedstock.

In the more preferred embodiment, said hard crackability feedstock is one selected from or includes slurry, diesel, gasoline and hydrocarbons with 4~8 carbon atoms or mixture thereof. Said easy crackability feedstock is selected from or includes petroleum hydrocarbons and/or other mineral oils, wherein the petroleum hydrocarbon is one selected from the group consisting of VGO, AGO, CGO, DAO, VR and AR or mixtures thereof, and the other mineral oil is one selected from the group consisting of coal liquefied oil, tar sand oil and shale oil or mixtures thereof. Said gasoline is one selected from or includes gasoline obtained from this process, catalytic cracking gasoline, straight-run gasoline, coker gasoline, pyrolysis gasoline, thermal cracking gasoline and hydrogasoline or mixture thereof, wherein catalytic cracking gasoline, straight-run gasoline, coker gasoline, pyrolysis gasoline, thermal cracking gasoline and hydrogasoline are those that are not obtained from the process of the present invention. Said diesel is one selected from or includes diesel obtained in this process, catalytic cracking diesel, straight-run diesel, coker diesel, pyrolysis diesel, thermal cracking diesel and hydrodiesel or mixture thereof, wherein catalytic cracking diesel, straight-run diesel, coker diesel, pyrolysis diesel, thermal cracking diesel and hydrodiesel are those that are not obtained from the process of the present invention. Said hydrocarbon with 4~8 carbon atoms is one selected from or includes those obtained from this process, or those that may be obtained from conventional catalytic cracking process, coking process, pyrolysis process, thermal cracking process, hydrotreating process and the like.

In the more preferred embodiment, said catalyst comprises zeolite, inorganic oxide and optional clay, which account for the following percent of the total weight of the catalyst respectively: zeolite 1~50% by weight, inorganic oxide 5~99% by weight, and clay 0~70% by weight. Said zeolite is selected from medium pore size zeolite and optional large pore size zeolite. Said medium pore size zeolite accounts for 51~100% of the total weight of the zeolite and said large pore size zeolite accounts for 0~49% of the total weight of the zeolite. The medium pore size zeolite is selected from ZSM series zeolites and/or ZRP zeolites, or ZSM and ZRP zeolites modified with nonmetal elements such as phosphor and/or transition metal elements such as iron, cobalt and nickel. See U.S. Pat. No. 5,232,675 for more detailed description of ZRP zeolites. The ZSM series zeolite is one selected from the group consisting of ZSM-5, ZSM-11, ZSM-12, ZSM-23, ZSM-35, ZSM-38, ZSM-48, and other zeolites with similar structure, or mixture thereof. See U.S. Pat. No. 3,702,886 for more detailed description of ZSM-5 zeolties. The large pore size zeolite is one selected from Y series zeolites, which include: rare-earth Y (REY), rare-earth HY (REHY), ultrastable Y and high silica Y obtained by different processes or mixtures thereof. The inorganic oxide as a binder is selected from silica ($SiO_2$) and/or alumina ($Al_2O_3$). The clay as a matrix (i.e. support) is selected from kaolin and/or halloysite. The catalytic cracking catalyst in each reactor may be identical or different.

In the more preferred embodiment, product vapors in step (3) can be separated to obtain a fraction of distillation range 180~260° C. The fraction can return to step (1) or/and step (2) as hard crackability feedstock or/and easy crackability feedstock.

Said fraction of distillation range 180~260° C. may be either obtained from this process, or from conventional catalytic cracking process, coking process, pyrolysis process, thermal cracking process, hydrotreating process and the like, or includes any other fraction rich in mono-ring aromatics.

In the more preferred embodiment, said reactor is selected from a riser, an iso-linear speed fluidized bed, an iso-diameter fluidized bed, a descending transfer line and a ascending transfer line or a combination thereof, or a combination of same reactors (two or more reactors), wherein said combination includes cascade or/and parallel. Said riser is a conventional iso-diameter riser or various diverse diameter risers. The velocity of the gas in the fluidized bed is between 0.1 m/s and 2.0 m/s (catalyst is neglected). The velocity of the gas in the riser is between 2 m/s and 30 m/s (catalyst is neglected).

One best embodiment of the present invention is conducted in a diverse diameter riser reactor. More detailed description of this reactor is referred to Chinese Patent Application CN1237477A.

In order to increase the catalyst/feedstock ratio in a downstream zone of the reactor and the catalyst activity, a part of medium can be fed, which is selected from or/and includes hot/cooled regenerated catalyst, regenerated catalyst, semi-regenerated catalyst, spent catalyst, fresh catalyst and the like. The cooled regenerated catalyst and the cooled semi-regenerated catalyst are obtained by cooling catalyst through catalyst cooler after the spent catalyst is regenerated in two-stage and one-stage regeneration respectively. The regenerated catalyst refers to a catalyst that has a residual carbon content of below 0.1% by weight, more preferably below 0.05% by weight. The semi-regenerated catalyst refers to a catalyst that has a residual carbon content of from 0.1% to 0.9% by weight, more preferably from 0.15% to 0.7% by weight. The spent catalyst refers to a catalyst that has a residual carbon content of above 0.9% by weight, more preferably from 0.9% to 1.2% by weight.

The process for separating products such as propylene from the reaction product is the same as those well known to the ordinary skilled in the art. The fraction of distillation range 180~260° C., more preferably 190~250° C. can be separated in an existing FCC fractionation column or an individual fractionation column. For the FGO fraction having an initial boiling point of above 250° C. or above 260° C. or above 330° C., it can be conveyed to an extractor to obtain heavy aromatic products and non-aromatic products (i.e. raffinate oil), or a hydrotreater to obtain the hydrotreated FGO, or it also can be used as the feedstock of FCC.

The extraction solvent of FGO is one selected from or includes dimethyl sulfoxide, furfural, dimethylformamide, monoethanolamine, ethylene glycol and 1,2-propanediol or mixture thereof. The extraction solvent can be recycled. The extraction temperature is 100° C., and the solvent/feedstock ratio is between 0.5 and 5.0 by volume. The extracted heavy aromatics are desired products, and the FGO raffinate oil (i.e. non-aromatic hydrocarbons) can be used as one of the FCC feedstocks.

The hydrotreating of FGO is conducted in the presence of hydrogen gas by contacting with a catalyst at the following conditions: hydrogen partial pressure 3.0 MPa~20.0 MPa, reaction temperature 300~450° C., hydrogen/oil ratio 300~2000 by volume, and volume hourly space velocity 0.1~3.0 $h^{-1}$. The hydrotreated FGO can be used as the feedstock of FCC.

The embodiment(s) of the present invention can integrate the fluid catalytic cracking process with the FGO hydrotreating process or/and the solvent extraction process of the aromatics of FGO to obtain a high octane gasoline and an improved yield of light olefins, particularly propylene, from heavy feedstocks having a relative low hydrogen content. The present invention has several important advantages over the prior art in that:

1. The propylene yield and the propylene selectivity in LGP are improved greatly, and the propylene yield is as high as 27% by weight.

2. The gasoline yield increases obviously, and the gasoline octane number is improved significantly.

3. The yields of dry gas and coke decrease while the propylene yield increases markedly.

4. The light oil yield increases and the slurry yield decreases significantly; therefore, the process of the present invention can utilize petroleum oil resources efficiently.

5. The run period of hydrotreating units increases considerably.

DETAILED DESCRIPTION OF THE EMBODIMENTS

The accompanying drawing, which is hereby incorporated in this specification, illustrates several embodiments of the invention and together with the description serve to explain but not limit the scope of the present invention. Thus, it will be apparent to one skilled in the art that certain modifications may be made to the invention as described without departing from the scope of the claims set out below.

Figure 1:
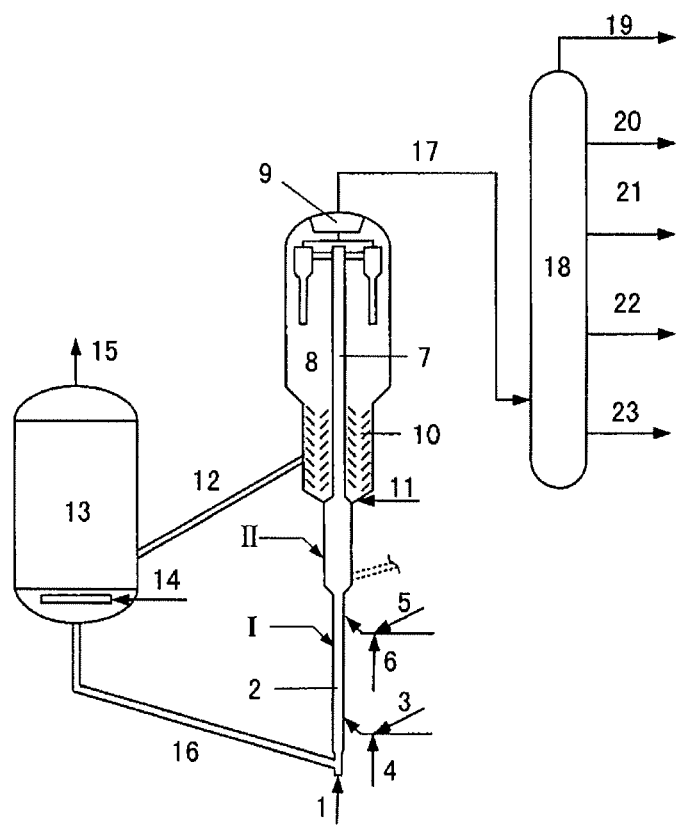
FIG. 1 is a schematic representation for the first embodiment of the process of the present invention.

According to the first specific embodiment of the present invention, the process of the present invention can be carried out according to the scheme shown in FIG. 1.

A prelift medium is introduced via a line 1 into the bottom of a riser reactor 2. The regenerated catalyst from a standpipe 16 is lifted by the prelift medium and moves upward. A portion of the feedstock from a line 3, along with the atomized steam from a line 4, is injected into the bottom of the reaction zone I of the riser reactor 2, and mixed with the existing stream in the riser reactor. Said feedstock cracks on the hot catalyst, and it moves upward. Another portion of feedstock from a line 5, along with the atomized steam from a line 6, is injected into the middle upper part of the reaction zone I of the riser reactor 2, and mixed with the existing stream in the riser reactor. The feedstock cracks on the lower catalyst having a deposited coke thereon, and it moves upward into the reaction zone II to continue to react. The resulting reaction product vapors and the deactivated spent catalyst, through a line 7, enter a cyclone separator of a disengager 8, wherein the spent catalyst and the reaction product vapors are separated. The reaction product vapors exit the cyclone and flow into a plenum chamber 9. Fine catalyst particles go back to the disengager via a dipleg. The spent catalyst in the disengager flows into a stripping section 10 and contacts with a steam from a line 11. The reaction product vapors stripped out of the spent catalyst enter the plenum chamber 9, via the cyclone. The stripped spent catalyst flows into a regenerator 13 via a standpipe 12. A main air enters the regenerator via a conduit 14 to burn off the coke deposited on the spent catalyst and regenerate the deactivated spent catalyst. Flue gas flows into turbine via a line 15. The regenerated catalyst is recycled into the riser reactor via the standpipe 16.

Reaction product vapors in the plenum chamber 9 are transported via a transfer line 17 and introduced into a sequent separation system 18. The separated LPG product is removed via a line 20; the separated gasoline product is removed via a line 21; the separated dry gas product is removed via a line 19; the separated diesel product is removed via a line 22; and the separated FGO product is removed via a line 23. The boiling ranges of various fractions can be adjusted according to the requirements of refinery.

Figure 2:
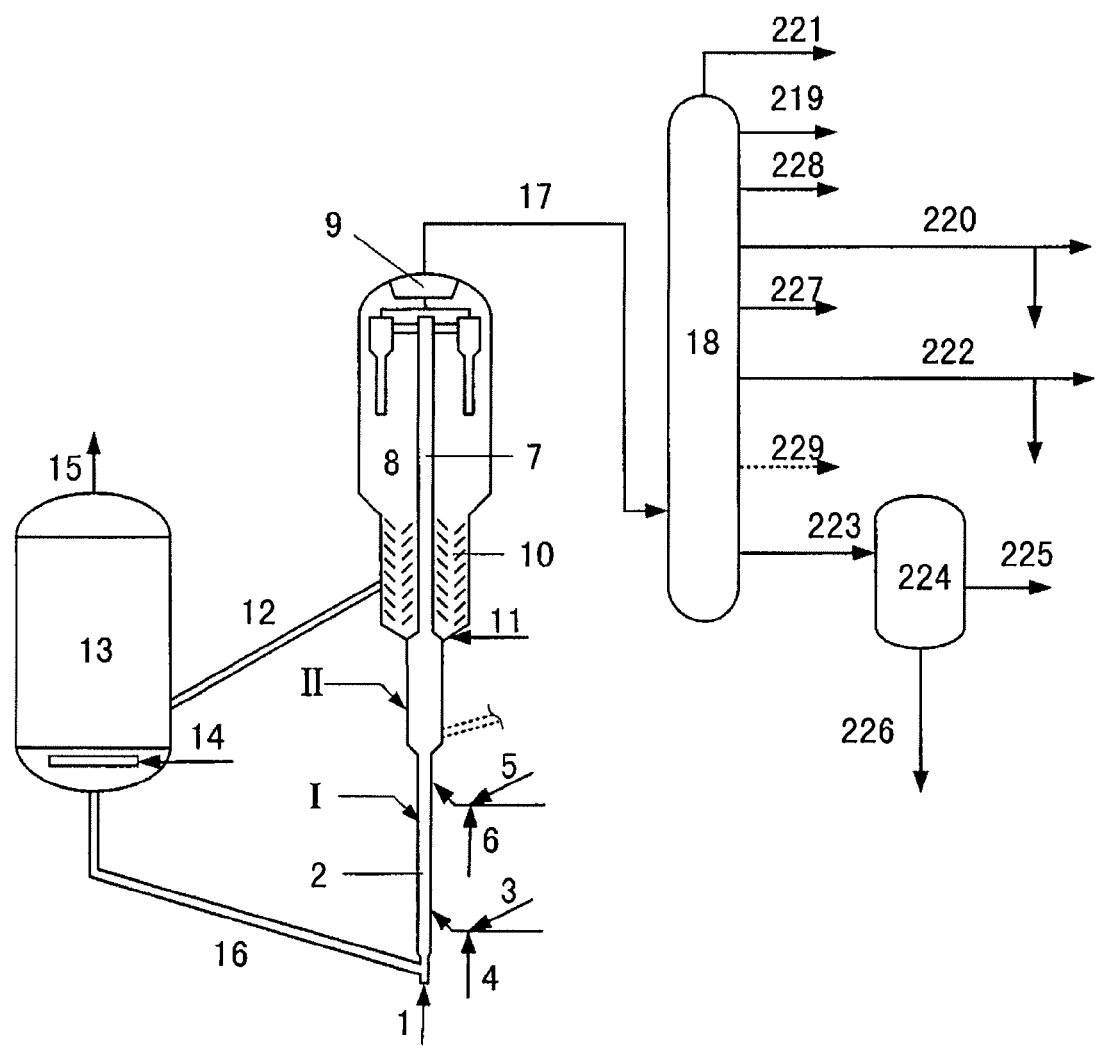
FIG. 2 is a schematic representation for the second embodiment of the process of the present invention.

According to the second specific embodiment of the present invention, the process of the present invention can be carried out according to the scheme shown in FIG. 2.

A prelift medium is introduced via a line 1 into the bottom of a riser reactor 2. The regenerated catalyst from a standpipe 16 is lifted by the prelift medium and moves upward. A hard crackability feedstock from a line 3, along with the atomized steam from a line 4, is injected into the bottom of the reaction zone I of the riser reactor 2, and mixed with the existing stream in the riser reactor. Said hard crackability feedstock cracks on the hot catalyst, and it moves upward. An easy crackability feedstock from a line 5, along with the atomized steam from a line 6, is injected into the middle upper part of the reaction zone I of the riser reactor 2, and mixed with the existing stream in the riser reactor. The easy crackability feedstock cracks on the lower catalyst having a deposited coke thereon, and it moves upward into the reaction zone II to continue to react. The resulting reaction product vapors and the deactivated spent catalyst, through a line 7, enter a cyclone separator of a disengager 8, wherein the spent catalyst and the reaction product vapors are separated. The reaction product vapors exit the cyclone and flow into a plenum chamber 9. Fine catalyst particles go back to the disengager via a dipleg. The spent catalyst in the disengager flows into a stripping section 10 and contacts with a steam from a line 11. The reaction product vapors stripped out of the spent catalyst enter the plenum chamber 9, via the cyclone. The stripped spent catalyst flows into a regenerator 13 via a standpipe 12. A main air enters the regenerator via a conduit 14 to burn off the coke deposited on the spent catalyst and regenerate the deactivated spent catalyst. Flue gas flows into turbine via a line 15. The regenerated catalyst is recycled into the riser reactor via the standpipe 16.

Reaction product vapors in the plenum chamber 9 are transported via a transfer line 17 and introduced into a sequent separation system 18. The separated propylene product is removed via a line 219; the separated propane product is removed via a line 228; the C4 olefin is removed via a line 220 and a portion thereof is recycled back to the riser reactor 2; the catalytic cracked dry gas is removed via a line 221; the boiling range 180~260° C. fraction is recycled back to the riser reactor 2 via a line 222; the boiling range 260~330° C. diesel fraction may be removed via a line 229, or may be removed along with the FGO into an extraction unit 224; the FGO is introduced via a line 223 into the extraction unit 224, wherein the separated heavy aromatics product is removed via a line 226 and the RFGO is recycled back to the riser reactor 2 via a line 225; the high octane number gasoline product (C5~180° C.) is removed via a line 227. The boiling ranges of various fractions can be adjusted according to the requirements of refinery.

Figure 3:
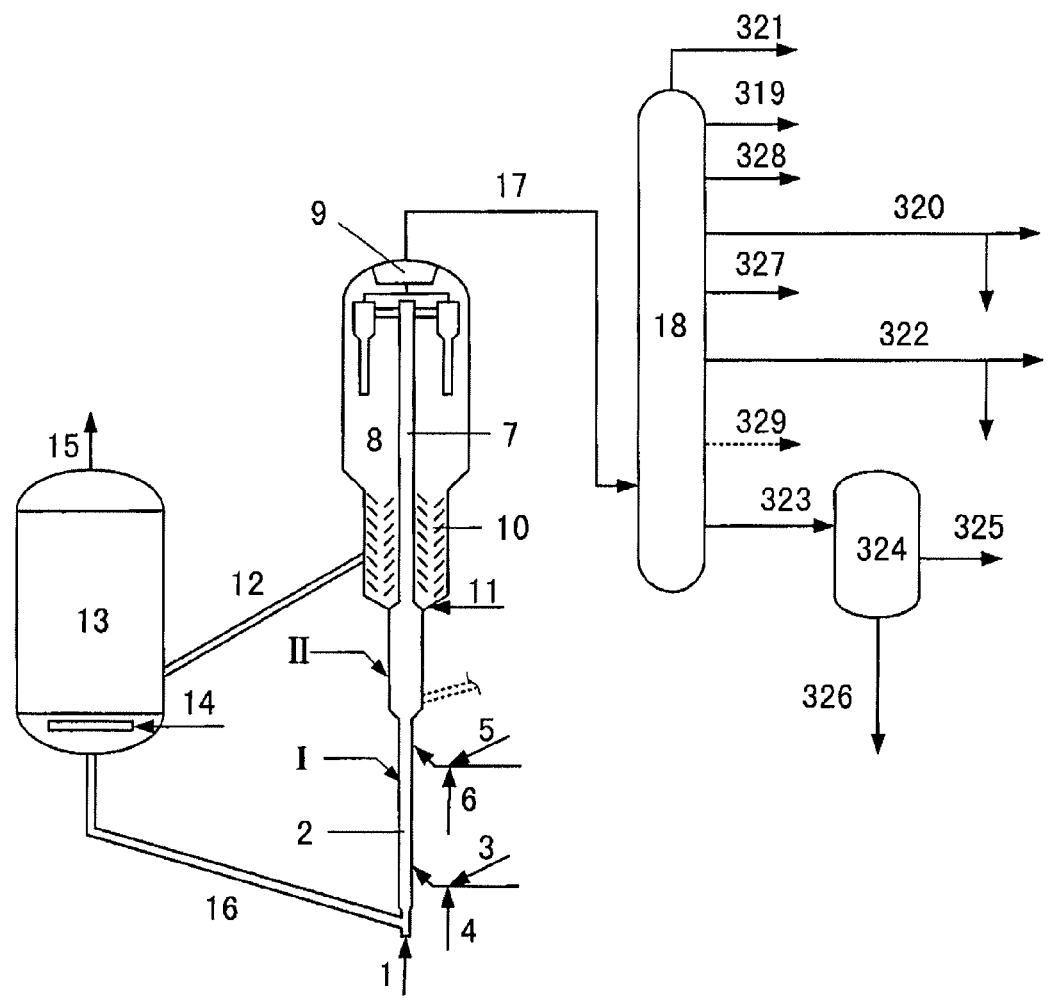
FIG. 3 is a schematic representation for the third embodiment of the process of the present invention.

According to the third specific embodiment of the present invention, the process of the present invention can be carried out according to the scheme shown in FIG. 3.

A prelift medium is introduced via a line 1 into the bottom of a riser reactor 2. The regenerated catalyst from a standpipe 16 is lifted by the prelift medium and moves upward. A hard crackability feedstock from a line 3, along with the atomized steam from a line 4, is injected into the bottom of the reaction zone I of the riser reactor 2, and mixed with the existing stream in the riser reactor. Said hard crackability feedstock cracks on the hot catalyst, and it moves upward. An easy crackability feedstock from a line 5, along with the atomized steam from a line 6, is injected into the middle upper part of the reaction zone I of the riser reactor 2, and mixed with the existing stream in the riser reactor. The easy crackability feedstock cracks on the lower catalyst having a deposited coke thereon, and it moves upward into the reaction zone II to continue to react. The resulting reaction product vapors and the deactivated spent catalyst, through a line 7, enter a cyclone separator of a disengager 8, wherein the spent catalyst and the reaction product vapors are separated. The reaction product vapors exit the cyclone and flow into a plenum chamber 9. Fine catalyst particles go back to the disengager via a dipleg. The spent catalyst in the disengager flows into a stripping section 10 and contacts with a steam from a line 11. The reaction product vapors stripped out of the spent catalyst enter the plenum chamber 9, via the cyclone. The stripped spent catalyst flows into a regenerator 13 via a standpipe 12. A main air enters the regenerator via a conduit 14 to burn off the coke deposited on the spent catalyst and regenerate the deactivated spent catalyst. Flue gas flows into turbine via a line 15. The regenerated catalyst is recycled into the riser reactor via the standpipe 16.

Reaction product vapors in the plenum chamber 9 are transported via a transfer line 17 and introduced into a sequent separation system 18. The separated propylene is removed via a line 319; the separated propane is removed via a line 328; the C4 olefin is removed via a line 320 or may be recycled back to the bottom of the reaction zone I of the riser reactor 2; the catalytic cracked dry gas is removed via a line 321; the catalytic cracked gasoline is remove via a line 327; the boiling range 180~260° C. fraction is recycled back to the bottom of the reaction zone I of the riser reactor 2 via a line 322; the boiling range above 260° C. fraction is introduced via a line 323 into a hydrotreating unit 324, wherein the separated light component is removed via a line 325 and the HFGO is recycled back to the middle upper part of the reaction zone I of the riser reactor 2 via line 326. The boiling ranges of various fractions can be adjusted according to the requirements of refinery.

The following examples are used to demonstrate the effect of the present invention and are not intended to limit the scope of the invention to the detailed examples shown herein. The properties of the feedstocks are listed in table 1.

Catalyst used in the examples was prepared as follows:

1) 20 g NH$_4$Cl was dissolved in 1000 g water, and 100 g (dry basis) crystallized product ZRP-1 zeolite (an MFI-structured zeolite produced in Qilu Petrochemical Co. with a SiO$_2$/Al$_2$O$_3$ molar ratio of 30, a content of rare earth RE$_2$O$_3$=2.0% by weight) was added to this solution, after exchanging at 90° C. for 0.5 h, filtering to yield a filter cake. 4.0 g of H$_3$PO$_4$ (with a concentration of 85 wt %) and 4.5 g of Fe(NO$_3$)$_3$ were dissolved in 90 g water to obtain a solution. The filter cake was impregnated with the obtained solution and dried. The resultant solid was calcined at 550° C. for 2 hours to yield an MFI-structured medium pore sized zeolite containing phosphor and iron. The anhydrous chemical formula of the catalyst was $$0.1Na_2O.5.1Al_2O_3.2.4P_2O_5.1.5Fe_2O_3.3.8RE_2O_3.88.1SiO_2.$$

2) 75.4 kg halloysite clay (an industrial product of Suzhou Porcelain Clay Co. with a solid content of 71.6% by weight) was slurried with 250 kg deionized water, whereto 54.8 kg pseudo-boehmite (an industrial product of Shandong Alumina Plant with a solid content of 63% by weight) was added. The PH value was adjusted at 2~4 with hydrochloric acid. The slurry was uniformly stirred and laid aside for aging at 60~70° C. for 1 hour. The temperature was decreased to below 60° C. while maintaining the PH value at 2~4, and then 41.5 kg alumina sol (a product of Qilu Petrochemical Co. with an Al$_2$O$_3$ content of 21.7% by weight) was added. After stirring for 40 min, a mixed slurry was obtained.

3) 22.5 kg (dry basis, prepared in step 1) MFI-structured medium pore sized zeolite containing phosphor and iron and 2.0 kg (dry basis) DASY zeolite (an ultrastable zeolite-Y product of Qilu Petrochemical Co. with a unit cell size of 2.445~2.448 nm) were added into the mixed slurry (prepared in step 2) and uniformly stirred to yield a slurry. The obtained slurry was shaped by spray drying, and the product was washed off the free Na$^+$ with ammonium dihydrogen phosphate solution (phosphor content 1% by weight). After drying, a sample of the catalytic cracking catalyst was obtained. The composition of the catalyst was 18 by weight of MFI-structured medium pore sized zeolite containing phosphor and iron, 2% by weight of DASY zeolite, 28% by weight of pseudo-boehmite, 7% by weight of alumina sol, and balanced kaolin.

Example 1

The experiment of the present example was carried out according to the scheme shown in FIG. 1. Feedstock A was directly used as the feedstock of catalytic cracking and the experiment was conducted in a pilot riser reactor plant. Feedstock A was injected into the reaction zone I, wherein the catalytic cracking reaction was conducted. The reaction temperature was 530° C., the WHSV was 30 h$^{-1}$, the C/O was 10, and the weight ratio of steam/the feedstock was 0.15. Reaction product vapors and the coked spent catalyst were separated in the disengager, and then the products were separated, wherein propylene, the gasoline and the FGO were withdrawn. Operating conditions and product slate were listed in table 2.

It can be seen from Table 2 that the yield of propylene attains as high as 18.29% by weight and those of dry gas and coke are only 2.36% and 3.95% by weight respectively, and the FGO yield is 30.12% by weight whose hydrogen content is 11.08% by weight.

Example 2

The experiment of the present example was carried out according to the scheme shown in FIG. 2. Feedstock A was directly used as the feedstock of catalytic cracking and the experiment was conducted in a pilot riser reactor plant. Easy crackability feedstock was injected into the middle-upper portion of reaction zone I, wherein the reaction temperature was 580° C., the WHSV was 60 h$^{-1}$, the catalytic cracking catalyst/the easy crackability feedstock (m/m) was 10, the weight ratio of steam/the easy crackability feedstock was 0.15. Hard crackability feedstock was charged in the bottom of the reaction zone I, wherein the reaction temperature was 640° C., the WHSV was 180 h$^{-1}$, the catalytic cracking catalyst/the hard crackability feedstock (m/m) was 60, and the weight ratio of steam/the hard crackability feedstock was 0.20. In reaction zone II, the reaction temperature was 540° C., the WHSV was 30 h$^{-1}$, and the weight ratio of steam/the easy crackability feedstock was 0.15. Reaction product vapors and the spent catalyst were separated in the disengager, and then the products were separated, wherein propylene and the gasoline were withdrawn and a portion of C4 olefin and 180~260° C. fractions were returned to the riser reactor. The FGO (the yield was 28.45% by weight and the hydrogen content was 11.01% by weight) was extracted with furfural, wherein the extraction temperature was 100° C., the solvent/FGO ratio was 3.0 (v/v), and then non-aromatic hydrocarbons and heavy aromatics were separated. The RFGO (that is said non-aromatic hydrocarbons) was mixed with the easy crackability feedstock and returned to the riser reactor. Operating conditions and product slate were listed in table 3.

It can be seen from Table 3 that the yield of propylene attains as high as 29.02% by weight; the gasoline yield is 33.71% by weight, and its research octane number (RON) and motor octane number (MON) are as high as 96.0 and 84.0 respectively.

Example 3

The experiment of the present example was carried out in the same plant as that in Example 2. Feedstock B was directly used as the feedstock of catalytic cracking and the experiment was conducted in a pilot riser reactor plant. Easy crackability feedstock was injected into the middle-upper portion of reaction zone I, wherein the reaction temperature was 580° C., the WHSV was 60 h$^{-1}$, the catalytic cracking catalyst/the easy crackability feedstock (m/m) was 10, and the weight ratio of steam/the easy crackability feedstock was 0.15. Hard crackability feedstock was charged in the bottom of the reaction zone I, wherein the reaction temperature was 640° C., the WHSV was 180 h$^{-1}$, the catalytic cracking catalyst/the hard crackability feedstock (m/m) was 60, and the weight ratio of steam/the hard crackability feedstock was 0.20. In addition, a portion of the stripped spent catalyst was introduced from the stripping section into the bottom of the reaction zone II, so as to decrease the temperature and the WHSV in the reaction zone II. In the reaction zone II, the reaction temperature was 530° C., the WHSV was 20 h$^{-1}$, and the weight ratio of steam/the easy crackability feedstock was 0.15. Reaction product vapors and the spent catalyst were separated in the disengager, and then the products were separated, wherein propylene and the gasoline were withdrawn and a portion of C4 olefin and 190~250° C. fraction were returned to the riser reactor. The FGO (the yield was 32.83% by weight and the hydrogen content was 10.98% by weight) was extracted with furfural, wherein the extraction temperature was 100° C., the solvent/FGO ratio was 3.0 (v/v), and then non-aromatic hydrocarbons and heavy aromatics were separated. The RFGO (that is said non-aromatic hydrocarbons) was mixed with the feedstock and returned to the riser reactor. Operating conditions and product slate were listed in table 3.

It can be seen from Table 3 that the yield of propylene attains as high as 28.01% by weight; the gasoline yield is as high as 35.20% by weight, and its research octane number (RON) and motor octane number (MON) are as high as 97.1 and 85.0 respectively.

Example 4

The experiment of the present example was carried out according to the scheme shown in FIG. 3. Feedstock A was directly used as the feedstock of catalytic cracking and the experiment was conducted in a pilot riser reactor plant. Easy crackability feedstock was injected into the middle-upper portion of reaction zone I, wherein the reaction temperature was 580° C., the WHSV was 60 h$^{-1}$, the catalytic cracking catalyst/the easy crackability feedstock (m/m) was 10, and the weight ratio of steam/the easy crackability feedstock was 0.15. Hard crackability feedstock was charged in the bottom of the reaction zone I, wherein the reaction temperature was 640° C., the WHSV was 180 h$^{-1}$, the catalytic cracking catalyst/the hard crackability feedstock (m/m) was 60, and the weight ratio of steam/the hard crackability feedstock was 0.20. In reaction zone II, the reaction temperature was 540° C., the WHSV was 30 h$^{-1}$, and the weight ratio of steam/the easy crackability feedstock was 0.15. Reaction product vapors and the spent catalyst were separated in the disengager, and then the products were separated, wherein propylene and the gasoline were withdrawn and a portion of C4 olefin and 180~260° C. fractions were returned to the riser reactor. The FGO (the initial boiling point is above 260° C. and the yield was 28.46% by weight and the hydrogen content was 11.01% by weight) was hydrotreated, wherein the reaction temperature was 350° C., the hydrogen partial pressure was 18.0 MPa, the hydrogen/oil ratio was 1500 by volume, and the volume hourly space velocity was 1.5 h$^{-1}$. The resulting HFGO was returned to the above-mentioned pilot riser reactor. Operating conditions and product slate were listed in table 4.

It can be seen from Table 4 that the yield of propylene attains as high as 30.02% by weight; the dry gas yield is only 3.32% by weight, and the liquid yield is 90.68% by weight.

Example 5

The experiment of the present example was carried out in the same plant as that in Example 4. Feedstock B was directly used as the feedstock of catalytic cracking and the experiment was conducted in a pilot riser reactor plant. Easy crackability feedstock was injected into the middle-upper portion of reaction zone I, wherein the reaction temperature was 580° C., the WHSV was 60 h$^{-1}$, the catalytic cracking catalyst/the easy crackability feedstock (m/m) was 10, and the weight ratio of steam/the easy crackability feedstock was 0.15. Hard crackability feedstock was charged in the bottom of the reaction zone I, wherein the reaction temperature was 640° C., the WHSV was 180 h$^{-1}$, the catalytic cracking catalyst/the hard crackability feedstock (m/m) was 60, and the weight ratio of steam/the hard crackability feedstock was 0.20. In addition, a portion of the stripped spent catalyst was introduced from the stripping section into the bottom of the reaction zone II, so as to decrease the temperature and the WHSV in the reaction zone II. In the reaction zone II, the reaction temperature was 530° C., the WHSV was 20 h$^{-1}$, and the weight ratio of steam/the easy crackability feedstock was 0.15. Reaction product vapors and the spent catalyst were separated in the disengager, and then the products were separated, wherein propylene and the gasoline were withdrawn and a portion of C4 olefin and 180~260° C. fractions were returned to the riser reactor. The FGO (the initial boiling point is above 260° C. and the yield was 32.56% by weight and the hydrogen content was 10.97% by weight) was hydrotreated, wherein the reaction temperature was 450° C., the hydrogen partial pressure was 10.0 MPa, the hydrogen/oil ratio was 500 by volume, and the volume hourly space velocity was 0.5 h$^{-1}$. The HFGO was returned to the above-mentioned pilot riser reactor. Operating conditions and product slate were listed in table 4.

It can be seen from Table 4 that the yield of propylene attains as high as 27.55% by weight; the dry gas yield is only 3.16% by weight, and the liquid yield is 90.64% by weight.

TABLE 1

|  | Examples 1, 2, 4 | Examples 3, 5 |
|---|---|---|
| No. Feedstock | A | B |
| Property of feedstock |  |  |
| Density (20° C.), g/cm$^3$ | 0.8886 | 0.9134 |
| Sulfur content, ppm | 4700 | 5800 |
| Nitrogen content, ppm | 1600 | 2900 |
| Aromatics m % | 26.3 | 32.6 |
| C, m % | 86.46 | 86.23 |
| H, m % | 12.86 | 12.69 |
| Boiling range (ASTM D-1160), ° C. |  |  |
| IBP | 312 | 327 |
| 10% | 361 | 363 |
| 30% | 412 | 409 |
| 50% | 452 | 450 |
| 70% | 478 | 482 |
| 90% | 506 | 504 |
| 95% | 532 | 526 |
| EP | 546 | 542 |

TABLE 2

|  | Example 1 |
|---|---|
| No. Feedstock | A |
| Operation condition |  |
| Reaction temperature, ° C. | 530 |
| WHSV, h$^{-1}$ | 30 |
| Steam/feedstock ratio, m/m | 0.15 |
| C/O, m/m | 10 |
| Product distribution, m % |  |
| Dry gas | 2.36 |
| LPG | 39.68 |
| Propylene | 18.29 |
| Gasoline | 21.53 |
| Diesel | 2.36 |
| FGO | 30.12 |
| Hydrogen content, m % | 11.08 |
| Boiling range, ° C. |  |
| IBP | 263 |
| EP | 554 |
| Coke | 3.95 |
| Total | 100.00 |

TABLE 3

|  | Example 2 | Example 3 |
|---|---|---|
| No. Feedstock | A | B |
| Catalytic cracking unit |  |  |
| Operation condition |  |  |
| Riser outlet temperature, ° C. | 530 | 520 |
| Riser reaction zone II |  |  |
| Reaction temperature, ° C. | 540 | 530 |
| WHSV, h$^{-1}$ | 30 | 20 |
| Steam/feedstock ratio, m/m | 0.15 | 0.15 |
| Riser reaction zone I |  |  |
| Reaction temperature, ° C. | 640/580 | 640/580 |
| C/O, m/m | 60/10 | 60/10 |
| WHSV, h$^{-1}$ | 180/60 | 180/60 |
| Steam/feedstock ratio, m/m | 0.20/0.15 | 0.20/0.15 |
| Solvent extraction unit |  |  |
| Temperature, ° C. | 100 | 100 |
| Solvent/FGO, v/v | 3.0 | 3.0 |
| Product distribution, m % |  |  |
| Dry gas | 3.86 | 3.46 |
| LPG | 50.23 | 48.16 |
| Propylene | 29.02 | 28.01 |
| Gasoline | 33.71 | 35.20 |
| Heavy aromatics | 5.15 | 6.01 |
| Coke | 7.05 | 7.17 |
| Total | 100.00 | 100.00 |
| Gasoline octane number |  |  |
| RON | 96.0 | 97.1 |
| MON | 84.0 | 85.0 |

TABLE 4

|  | Example 4 | Example 5 |
|---|---|---|
| No. Feedstock | A | B |
| Catalytic cracking unit |  |  |
| Operation condition |  |  |
| Riser outlet temperature, ° C. | 530 | 520 |
| Riser reaction zone II |  |  |
| Reaction temperature, ° C. | 540 | 530 |
| WHSV, h$^{-1}$ | 30 | 20 |
| Steam/feedstock ratio, m/m | 0.15 | 0.15 |
| Riser reaction zone I |  |  |
| Reaction temperature, ° C. | 640/580 | 640/580 |
| C/O, m/m | 60/10 | 60/10 |
| WHSV, h$^{-1}$ | 180/60 | 180/60 |
| Steam/feedstock ratio, m/m | 0.20/0.15 | 0.20/0.15 |
| Hydrotreating unit |  |  |
| Hydrogen partial pressure, Mpa | 18.0 | 10.0 |
| Reaction temperature, ° C. | 350 | 450 |
| Hydrogen/feedstock ratio, v/v | 1500 | 500 |
| Volume hourly space velocity, h$^{-1}$ | 1.5 | 0.5 |
| Product distribution, m % |  |  |
| Dry gas | 3.32 | 3.16 |
| LPG | 51.23 | 48.12 |
| Propylene | 30.02 | 27.55 |
| Gasoline | 31.12 | 33.05 |
| Diesel | 8.33 | 9.47 |
| Coke | 6.0 | 6.2 |
| Total | 100.00 | 100.00 |

The invention claimed is:

1. A catalytic conversion process, which comprises catalytic cracking reaction of a hydrocarbon feedstock by contacting the feedstock with a medium pore size zeolite-enriched catalyst in a reactor to obtain reaction products, characterized in that the reaction temperature, weight hourly space velocity and catalyst/feedstock ratio by weight are sufficient to achieve a yield of fluid catalytic cracking gas oil between 12% and 60% by weight of said feedstock, wherein said weight hourly space velocity is between 25 h$^{-1}$ and 100 h$^{-1}$, said reaction temperature is between 450° C. and 600° C., and said catalyst/feedstock ratio by weight is between 1 and 30, wherein the initial boiling point of fluid catalytic cracking gas oil is not less than 260° C., and the hydrogen content of fluid catalytic cracking gas oil is not less than 10.5% by weight, wherein said catalyst comprises zeolite 1~50% by weight, inorganic oxide 5~99% by weight, and clay 0~70% by weight of the total weight of the catalyst respectively, wherein said zeolite comprises a medium pore size zeolite selected from ZSM series zeolites, ZRP zeolites and a combination thereof and optionally large pore size zeolite, selected from Y series zeolites;

said medium pore size zeolite, accounting for 51~100% of the total weight of the zeolite and said large pore size zeolite, accounting for 0~49% of the total weight of the zeolite.

2. The process according to claim 1, wherein said feedstock is selected from petroleum hydrocarbons and/or other mineral oils, wherein the petroleum hydrocarbon is selected from the group consisting of vacuum gas oil, atmospheric gas oil, coker gas oil, deasphalted oil, vacuum residue and atmospheric residue or mixtures thereof, and said other mineral oil is selected from the group consisting of coal liquefied oil, tar sand oil and shale oil or mixtures thereof.

3. The process according to claim 1, wherein said reactor is selected from a riser, an iso-linear speed fluidized bed, an iso-diameter fluidized bed, a descending transfer line and a ascending transfer line or a combination thereof, or a combination of two or more same reactors, wherein said combination includes cascade or/and parallel, and wherein said riser is a conventional iso-diameter riser or various diverse diameter risers.

4. The process according to claim 1, wherein said feedstock is charged into the reactor from one position, or from two or more positions whose height are same or different.

5. The process according to claim 1, wherein the reaction temperature is 460~580° C., the weight hourly space velocity is 30~80 h$^{-1}$, and the catalyst/feedstock ratio by weight is 2~15.

6. The process according to claim 1, wherein the reaction temperature is 480~540° C.

7. The process according to claim 1, wherein the weight hourly space velocity is 40~60 h$^{-1}$.

8. The process according to claim 1, wherein the catalyst/feedstock ratio by weight is 3~14.

9. The process according to claim 1, wherein the reaction is carried out under a pressure of 0.1~1.0 MPa.

10. The process according to claim 1, further comprising separation of reaction products and catalyst, wherein the catalyst is stripped, regenerated by burning off the coke, and then returned to reactor; and wherein the separated products include propylene, high octane gasoline and fluid catalytic cracking gas oil.

11. The process according to claim 1, wherein the initial boiling point of fluid catalytic cracking gas oil is not less than 330° C., and hydrogen content of fluid catalytic cracking gas oil is not less than 10.8% by weight.

12. A catalytic conversion process, wherein feedstocks are reacted by contacting them with a medium pore size zeolite-enriched catalyst in a reactor to obtain reaction products, wherein:

(1) said feedstocks include hard crackability feedstock and easy crackability feedstock, which are injected into the reactor from one position, or from two or more positions whose height are same or different, (2) said hard crackability feedstock reacts in the reactor not later than easy crackability feedstock, (3) reaction temperature, weight hourly space velocity and catalyst/feedstock ratio by weight are sufficient to achieve a yield of fluid catalytic cracking gas oil between 12% and 60% by weight of easy crackability feedstock, wherein initial boiling point of fluid catalytic cracking gas oil is not less than 260° C., and hydrogen content of fluid catalytic cracking gas oil is not less than 10.5% by weight, and (4) said weight hourly space velocity of easy crackability feedstock is 5~100 h$^{-1}$, wherein said hard crackability feedstock is selected from slurry, diesel, gasoline, hydrocarbons with 4-8 carbon atoms or a mixture thereof, wherein said easy crackability feedstock is selected from petroleum hydrocarbons and/or other mineral oils, wherein the petroleum hydrocarbon is selected from the group consisting of vacuum gas oil, atmospheric gas oil, coker gas oil, deasphalted oil, vacuum residue and atmospheric residue, or mixtures thereof, and the other mineral oil is selected from the group consisting of coal liquefied oil, tar sand oil and shale oil, or mixtures thereof, wherein said catalyst comprises zeolite 1~50% by weight, inorganic oxide 5~99% by weight, and clay 0~70% by weight of the total weight of the catalyst respectively, wherein said zeolite comprises a medium pore size zeolite selected from ZSM series zeolites, ZRP zeolites and a combination thereof and optionally large pore size zeolite, selected from Y series zeolites, said medium pore size zeolite, accounting for 51~100% of the total weight of the zeolite and said large pore size zeolite, accounting for 0~49% of the total weight of the zeolite, wherein reaction conditions for hard crackability feedstock are: reaction temperature between 600° C. and 750° C., weight hourly space velocity between 100 h$^{-1}$ and 800 h$^{-1}$, catalyst/feedstock ratio by weight between 30 and 150, reaction pressure between 0.10 MPa and 1.00 MPa and steam/hard crackability feedstock ratio by weight between 0.05 and 1.00, and wherein reaction conditions for easy crackability feedstock are: reaction temperature between 450° C. and 600° C., weight hourly space velocity between 5 h$^{-1}$ and 100 h$^{-1}$, catalyst/feedstock ratio by weight between 1 and 30, reaction pressure between 0.10 MPa and 1.00 MPa and steam/hard crackability feedstock ratio by weight between 0.05 and 1.00.

13. The process according to claim 12, wherein said reactor is selected from a riser, an iso-linear speed fluidized bed, an iso-diameter fluidized bed, a descending transfer line and a ascending transfer line or a combination thereof, or a combination of two or more same reactors, wherein said combination includes cascade or/and parallel, and wherein said riser is a conventional iso-diameter riser or various diverse diameter risers.

14. The process according to claim 12, wherein the reaction temperature of easy crackability feedstock is between 460° C. and 560° C.

15. The process according to claim 12 wherein the weight hourly space velocity of easy crackability feedstock is between 10 h$^{-1}$ and 90 h$^{-1}$.

16. The process according to claim 12, wherein the catalyst/easy crackability feedstock ratio by weight is between 1 and 14.

17. The process according to claim 12, further comprising:
separation of reaction products and catalyst, wherein the catalyst is stripped, regenerated by burning off the coke, and then returns to reactor; and
wherein the separated products include propylene, high octane number gasoline and fluid catalytic cracking gas oil.

18. The process according to claim 12, wherein the initial boiling point of fluid catalytic cracking gas oil is not less than 330° C., and hydrogen content of fluid catalytic cracking gas oil is not less than 10.8% by weight.

19. The process according to claim 12, wherein:
(1) the feedstock comprising hard crackability feedstock is contacted with a medium pore size zeolite-enriched catalyst and cracked in a reactor under the conditions of a reaction temperature between 600° C. and 750° C., a weight hourly space velocity between 100 $h^{-1}$ and 800 $h^{-1}$, a reaction pressure between 0.10 MPa and 1.00 MPa, a catalyst/hard crackability feedstock ratio by weight between 30 and 150 and a steam/hard crackability feedstock ratio between 0.05 and 1.00 by weight,
(2) a reaction stream containing hard crackability feedstock, along with easy crackability feedstock, is further cracked under the conditions of a reaction temperature between 450° C. and 600° C., a weight hourly space velocity between 5 $h^{-1}$ and 100 $h^{-1}$, a reaction pressure between 0.10 MPa and 1.00 MPa, a catalyst/easy crackability feedstock ratio by weight between 1.0 and 30.0 and a steam/easy crackability feedstock ratio between 0.05 and 1.00 by weight,
(3) the spent catalyst and product vapors are separated by cyclone separator; optionally the spent catalyst is charged into stripping section and stripped, the stripped spent catalyst is regenerated by burning off the coke and returned to the reactor; and the product vapors are separated to obtain a product comprising propylene, high octane gasoline and fluid catalytic cracking gas oil,
(4) said fluid catalytic cracking gas oil is hydrotreated or/and is extracted with aromatic hydrocarbons to obtain a hydrotreated fluid catalytic cracking gas oil or/and a raffinate of fluid catalytic cracking gas oil, said hydrotreated fluid catalytic cracking gas oil or/and said raffinate of fluid catalytic cracking gas oil return to step (1) or/and step (2) as hard crackability feedstock or/and easy crackability feedstock.

20. The process according to claim 19, wherein the initial boiling point of fluid catalytic cracking gas oil is not less than 330° C., and hydrogen content of fluid catalytic cracking gas oil is not less than 10.8% by weight.

21. The process according to claim 19, wherein said product vapors in step (3) can be separated to obtain a fraction of distillation range 180~260° C., the fraction returns to step (1) or/and step (2) as hard crackability feedstock or/and easy crackability feedstock.

22. The process according to claim 19, wherein said medium pore size zeolite accounts for 70~100% of the total weight of the zeolite.

23. The process according to claim 19, wherein said reactor is selected from a riser, an iso-linear speed fluidized bed, an iso-diameter fluidized bed, a descending transfer line and a ascending transfer line or a combination thereof, or a combination of two or more same reactors, wherein said combination includes cascade or/and parallel, and wherein said riser is a conventional iso-diameter riser or various diverse diameter risers.

* * * * *

UNITED STATES PATENT AND TRADEMARK OFFICE
CERTIFICATE OF CORRECTION

| | | |
|---|---|---|
| PATENT NO. | : 8,696,887 B2 | Page 1 of 1 |
| APPLICATION NO. | : 12/672666 | |
| DATED | : April 15, 2014 | |
| INVENTOR(S) | : Youhao Xu et al. | |

It is certified that error appears in the above-identified patent and that said Letters Patent is hereby corrected as shown below:

Please add the following Assignee to the Title Page:

(73) Assignee: -- RESEARCH INSTITUTE OF PETROLEUM PROCESSING, SINOPEC --

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,696,887 B2 | Page 1 of 1 |
| APPLICATION NO. | : 12/672666 | |
| DATED | : April 15, 2014 | |
| INVENTOR(S) | : Xu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 873 days.

Signed and Sealed this
Twenty-first Day of October, 2014

Michelle K. Lee
*Deputy Director of the United States Patent and Trademark Office*